United States Patent
Yang et al.

(10) Patent No.: US 11,329,556 B1
(45) Date of Patent: May 10, 2022

(54) MULTI-INPUT SINGLE OUTPUT POWER SYSTEM AND OPERATING METHOD THEREOF

(71) Applicant: Monolithic Power Systems, Inc., San Jose, CA (US)

(72) Inventors: Heng Yang, San Jose, CA (US); Yi Sun, Saratoga, CA (US); Thomas Fenn, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 17/324,479

(22) Filed: May 19, 2021

(51) Int. Cl.
  *H02M 3/155* (2006.01)
  *H02M 1/08* (2006.01)
(52) U.S. Cl.
  CPC ............. *H02M 3/155* (2013.01); *H02M 1/08* (2013.01)
(58) Field of Classification Search
  None
  See application file for complete search history.

(56) References Cited

U.S. PATENT DOCUMENTS

| | | | | |
|---|---|---|---|---|
| 7,215,102 B2* | 5/2007 | Harris | ................. | H02M 3/1584 323/268 |
| 7,301,317 B1* | 11/2007 | Mattingly | ........... | H02M 3/1584 323/282 |
| 8,493,044 B2* | 7/2013 | Xu | ....................... | H02M 3/1588 323/282 |
| 8,648,496 B2* | 2/2014 | Carralero | ................ | H02J 1/102 307/80 |
| 9,214,866 B2* | 12/2015 | Nora | .................... | H02M 3/1584 |
| 9,912,240 B1 | 3/2018 | Nguyen et al. | | |
| 10,601,223 B2* | 3/2020 | Aragones Ortiz | ...... | H02M 1/14 |
| 2021/0028683 A1 | 1/2021 | Jiang et al. | | |
| 2021/0028686 A1 | 1/2021 | Jiang et al. | | |
| 2021/0028704 A1 | 1/2021 | Jiang et al. | | |

OTHER PUBLICATIONS

U.S. Appl. No. 17/183,984, filed Feb. 24, 2021, Chengdu Monolithic Power System Co., Ltd.
U.S. Appl. No. 17/184,052, filed Feb. 24, 2021, Chengdu Monolithic Power System Co., Ltd.
U.S. Appl. No. 17/184,093, filed Feb. 24, 2021, Chengdu Monolithic Power System Co., Ltd.

* cited by examiner

*Primary Examiner* — Jeffery S Zweizig
(74) *Attorney, Agent, or Firm* — Perkins Coie LLP (57) ABSTRACT

A multi-input single output power system for outputting an output voltage on an output node. It includes a first integrated circuit (IC) converter device and a second IC converter device. The first IC converter device has a first pin to receive a first input voltage, a second pin to output the output voltage, and a first power unit coupled between the first pin and the second pin. The second IC converter device has a first pin to receive a second input voltage, a second pin to output the output voltage, a second power unit coupled between the first pin of the second IC converter device and the second pin of the second IC converter device, and a third pin. The third pin receives an external phase shedding control signal to determine whether to stop the second power unit from providing power to the output node.

18 Claims, 9 Drawing Sheets

MULTI-INPUT SINGLE OUTPUT POWER SYSTEM AND OPERATING METHOD THEREOF

TECHNICAL FIELD

The present invention generally relates to electronic circuits, and more particularly but not exclusively, to multi-input single output power systems and operating method thereof.

BACKGROUND

Figure 1:
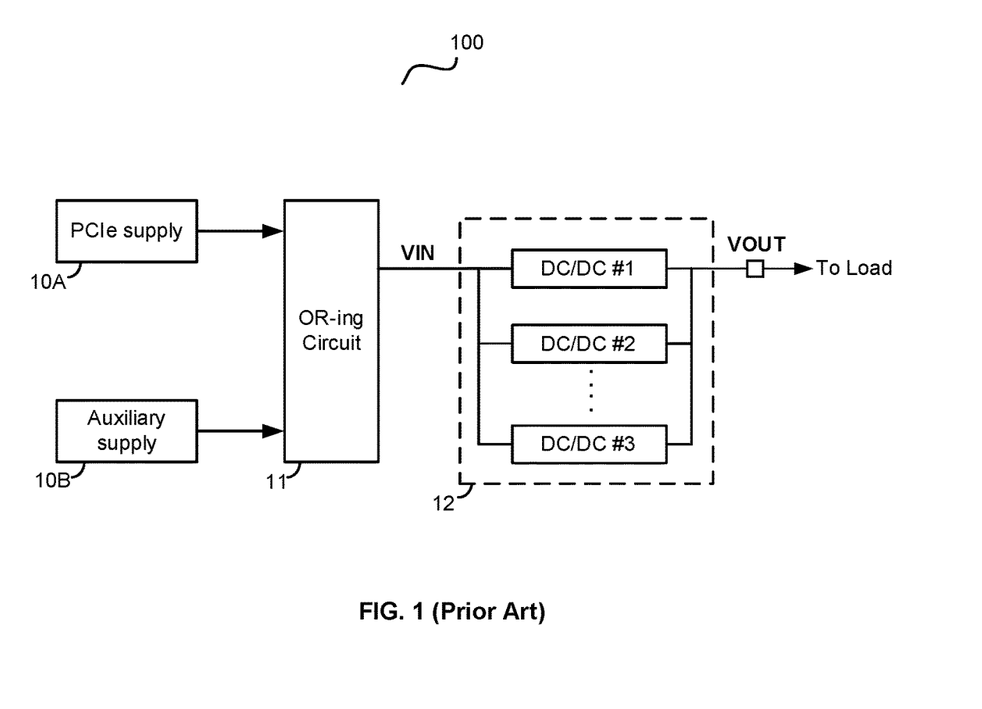
FIG. 1 shows a redundant power architecture 100.

PCIe (peripheral component interconnect express) is an interface standard for connecting and supplying high-speed components, such as graphics cards. One PCIe slot only can provide a maximum of 75 W of power. The graphics cards that need higher than 75 W usually require auxiliary power supplies, as shown in FIG. 1, provided by both a 75 W PCIe power supply 10A and a 325 W auxiliary power supply 10B. FIG. 1 is a redundant power architecture 100 comprising the PCIe power supply 10A, the auxiliary power supply 10B, an OR-ing circuit 11 and a multiphase switching converter 12. The multiphase switching converter 12 comprises of a plurality of parallel-connected DC/DC converters driving a single load. The OR-ing circuit 11 is used to choose between the two available power supplies for providing an input voltage VIN to the multiphase switching converter 12 and typically is un-directional current path. As either of the two power supplies (10A and 10B) will be used at a time in the OR-ing solution, power limit of the power architecture 100 is set and locked to the maximum wattage of the auxiliary power supply. This power limit not only limit the load performance, but also not always correspond to the actual current handing capabilities of the individual graphics cards.

Thus, how to fully utilize the power from both power supplies, so that the power limit is unlocked and could allow enthusiasts to extract every bit of performance from the graphics cards they purchase, becomes a new challenge.

SUMMARY

An object of the present invention is to enhance the power capabilities for a multi-input single output power system. The multi-input single output power system has an output node for outputting an output voltage, comprises a first integrated circuit (IC) converter device and a second IC converter device. The first IC converter device comprises a first pin configured to receive a first input voltage, a second pin configured to output the output voltage, and a first power unit coupled between the first pin of the first IC converter device and the second pin of the first IC converter device. The first power unit is configured to provide power to the output node. The second IC converter device comprises a first pin configured to receive a second input voltage, a second pin configured to output the output voltage, a second power unit and a third pin. The second power unit is coupled between the first pin of the second IC converter device and the second pin of the second IC converter device. The third pin of the second IC converter device receives a phase shedding control signal to determine whether to stop the second power unit from providing power to the output node.

Another object of the present invention is to provide a multi-input single output power system having a plurality of IC converter devices that has a common output node for outputting an output voltage. The plurality of the IC converter devices is configured as a multi-phase switching converter in a daisy chain. The multi-input single output power system comprises a first IC converter device of the plurality of IC converter devices, a second IC converter device of the plurality of IC converter devices, and an auxiliary DC/DC converter. The first IC converter device comprises a first pin configured to receive a first input voltage, a second pin configured to output the output voltage, and a first power unit coupled between the first pin of the first IC converter device and the second pin of the first IC converter device. The first power unit is configured to provide power to the output node. The second IC converter device comprises a first pin configured to receive a second input voltage from an external power supply, a second pin configured to output the output voltage, a second power unit coupled between the first pin of the second IC converter device and the second pin of the second IC converter device, and a third pin. The third pin of the second IC converter device is configured to determine whether to stop the second power unit from providing power to the output node based on the condition of the second input voltage on the first pin of the second IC converter device. The auxiliary DC/DC converter has an input terminal and an output terminal, wherein the input terminal is configured to receive the first input voltage on the first pin of the first IC converter device. The output terminal is configured to provide the second input voltage on the first pin of the second IC converter device, when a connection of the first pin of the second IC converter device to the external power supply has been removed.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Figure 2:
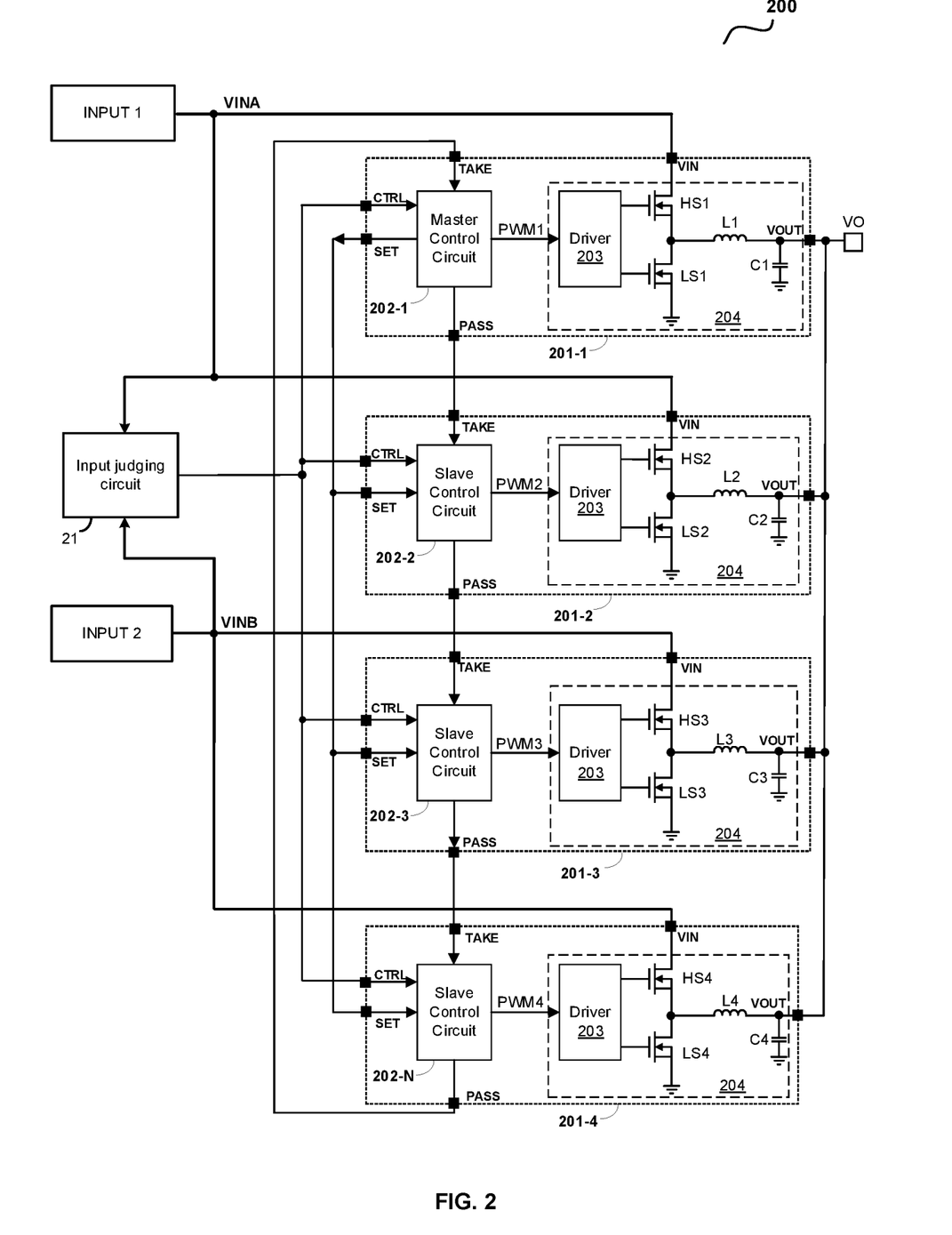
FIG. 2 shows a schematic diagram of a multi-input single output power system 200 in accordance with an embodiment of the present invention.

FIG. 2 shows a schematic diagram of a multi-input single output power system 200 in accordance with an embodiment of the present invention. In the example of FIG. 2, the power system 200 comprises a plurality of monolithic integrated circuit (IC) converter devices 201 (i.e., 201-1, 201-2, 201-3 and 201-4) that are connected in parallel. In the example of FIG. 2, the power system 200 includes four converter devices to form a four-phase switching converter for illustration purposes. As can be appreciated, the power system 200 can also include converter devices with any number to form any other multiphase switching converter.

In the example of FIG. 2, the power system 200 comprises a plurality of integrated control circuits 202 (i.e., 202-1~202-4) configured in a daisy chain, and a plurality of power units 204 coupled in parallel. Each one of the plurality of integrated control circuit 202 is configured to provide a switch control signal PWM to a corresponding power unit 204.

In one embodiment, each one of the plurality of converter devices 201 is a monolithic IC in that it is a single-die chip. Each one of the plurality of converter devices 201 has a plurality of pins that comprises a VIN pin for receiving an input supply voltage and a VOUT pin that is connected to a load 210. The load 210 that consumes power is connected a single output node of the multi-input single output power system 200.

In the example of FIG. 2, two converter devices (201-1, 201-2) are coupled in parallel to form a first group, the VIN pins of the converter devices (201-1, 201-2) are tied together and connected to a first input source INPUT 1, to receive a first input voltage VINA. Another two converter devices (201-3, 201-4) are coupled in parallel to form a second group, the VIN pins of the converter devices (201-3, 201-4) are tied together and connected to a second input source INPUT 2, to receive a second input voltage VINB. The VOUT pins of the converter devices (201-1, 201-2, 201-3, 201-4) are tied together, provide a combined output voltage VO at the tied VOUT pins. The multi-input single output power system 200 is configured to convert the first input voltage VINA and the second input voltage VINB into the output voltage VO for the load 210. It allows users to make full use of the power from the first input source and the second input source. In the example of FIG. 2, the power system 200 is a dual-input single output power system for illustration purposes. As can be appreciated, the power system 200 can be any multi-input single output power system. The multi-input single output power system 200 with more input sources can have unlocked power limits. Accordingly, the power capabilities of the power system 200 can be enhanced. The power system 200 allows it to cover any power requirement, for example, even higher than a total power of 75 W and 325 W.

In the example of FIG. 2, the plurality of power units 204 could be configured to have same topology. In one embodiment, each one of the plurality of power units 204 includes a power switch (e.g., HS) as well as a driver circuit 203 that drives the power switch for turning the power switch ON and OFF in a controlled manner. The power switch can have a first terminal connected to the VIN pin and a second terminal connected to the VOUT pin through an energy storage element. In one embodiment, the power unit 204 is configured in synchronous BUCK, which includes a high side power switch HS, a low side power switch LS, an inductor L and an output capacitor C. When turned ON, the power switch HS connects the input source that is connected to the VIN pin to the load 210 that is connected to the VOUT pin through the inductor L.

In the example of FIG. 2, the plurality of pins of each converter device further comprises a CTRL pin for enabling/disabling the converter device 201. The power system 200 further comprises an input judging circuit 21 with an output terminal that is coupled to the tied CTRL pins of the converter devices 201. The input judging circuit 21 can enable or disable the converter device 201 by sending an enable control signal to the CTRL pin of the converter device 201.

In one embodiment, the converter device 201 is enabled, i.e., operable to provide power from the input source (INPUT 1 or INPUT2) to the load 210, when the enable control signal is asserted on the CTRL pin of the converter device 201. The converter device 201 is disabled, i.e., stop providing power to the load 210, when the enable control signal is not asserted.

In the example of FIG. 2, the input judging circuit 21 is configured to generate an enable control signal based on conditions of two input sources. In one embodiment, the first input source INPUT1 is always plug-in or available, and the second input source INPUT2 can be flexibly and selectively plug-in or unplugged. The input judging circuit 21 can sense the first input voltage VINA at pins VIN of the first group converter devices (201-1, 201-2) and the second input voltage VINB at pins VIN of the second group converter devices (201-3, 201-4), and sends the enable control signal to the tied CTRL pins of the converter devices 201.

In the example of FIG. 2, the plurality of control circuits 202 (i.e., 202-1~202-4) are configured in the daisy chain. Each control circuit 202 has a first terminal, a second terminal and a third terminal. Meanwhile, the plurality of pins of the converter device 201 further comprises a SET pin connected to the first terminal, a TAKE pin connected to the second terminal, and a PASS pin connected to the third terminal of the control circuit 202.

Because of the daisy chain architecture, the converter devices 201 in the power system 200 has an operation that is similar to a relay race. The relay is carried through a PASS/TAKE loop. SET pin of the converter device 201 is coupled to the pins SET of the rest of converter devices, to share a phase control signal. TAKE pin of the converter device 201 is connected to PASS pin of a previous converter device in the daisy chain, to receive a phase input signal. PASS pin of the converter device 201 is connected to TAKE pin of a latter converter device 201 in the daisy chain, to provide a phase output signal. Wherein the phase control signal includes a plurality of pulses for successively triggering the plurality of power units 204 to provide power to a load that connected to the common output node, and wherein the control circuit obtains the sequence information based on the phase input signal and phase control signal.

Because of the daisy chain architecture, users can easily change the number of the plurality of converter devices 201 in power system 200 according to practical requirements. If more converter devices 201 are required, the users only need to add new control circuits and corresponding power units into the daisy chain, with very simple adjustment of electrical connections. The number of the plurality of converter devices 201 connected to each input source depends on power availability of the input source, output power requirement, efficiency requirement of the system, and output voltage ripple requirement.

Figure 3:
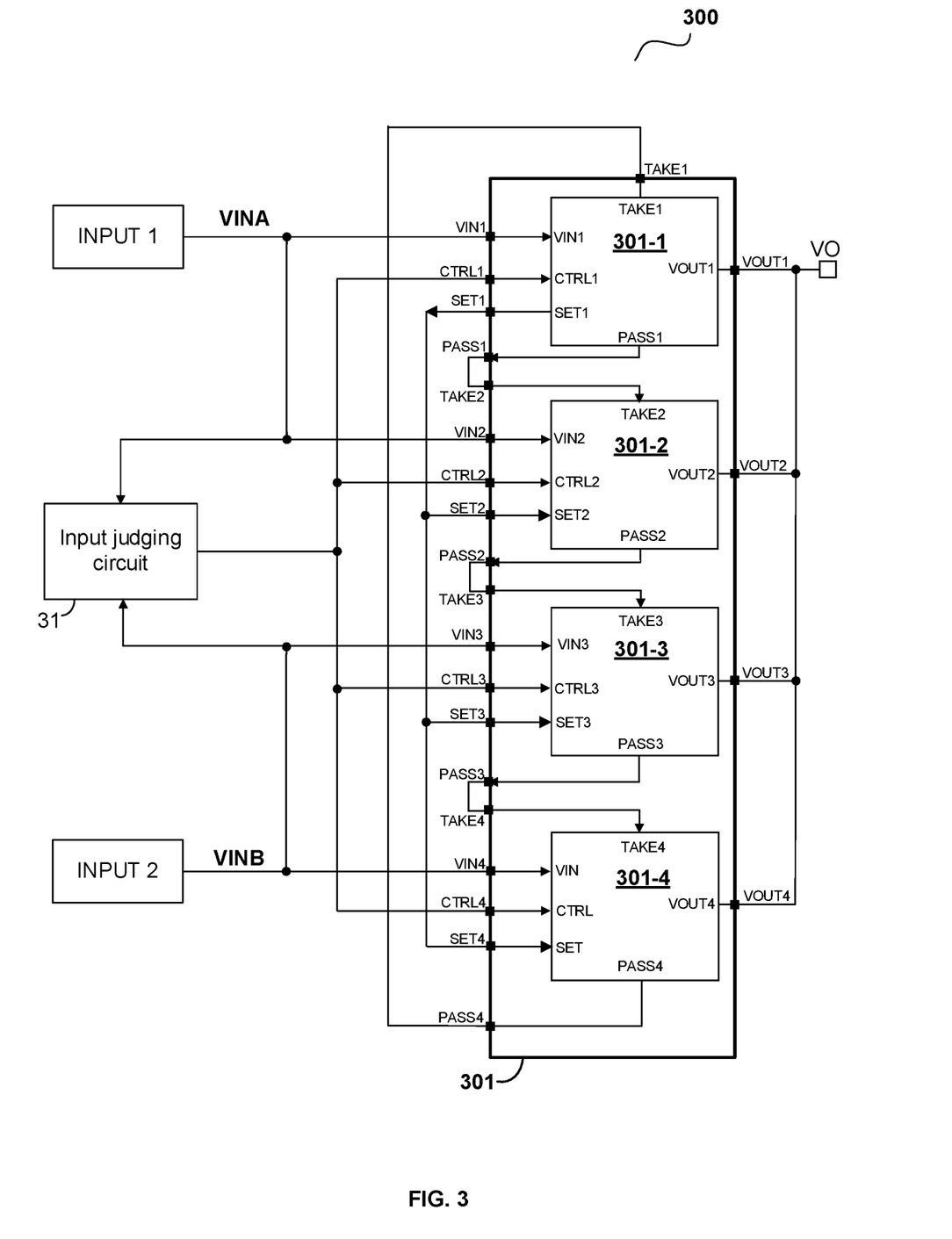
FIG. 3 shows a schematic diagram of a multi-input single output power system 300 in accordance with another embodiment of the present invention.

FIG. 3 shows a schematic diagram of a multi-input single output power system 300 in accordance with an embodiment of the present invention. In the example of FIG. 3, the power system 300 comprises a multi-phase switching converter 301 configured as a single-die chip and an input judging circuit 31.

The multi-phase switching converter 301 comprises a plurality of converter devices configured in a daisy chain, wherein the plurality of converter devices 301 has same internal structure as the plurality of converter devices 201 shown in FIG. 2.

In one embodiment, the power system 300 is a multi-input single output power system. In the example of FIG. 3, the multi-phase switching converter 301 is a monolithic IC having a plurality of pins. VIN1 pin and VIN2 pin are tied together to receive a first input voltage VINA from a first input source INPUT 1. VIN3 pin and VIN4 pin are tied together to receive a second voltage VINB from a second input sources INPUT 2. VOUT1~VOUT4 pins are tied together to provide a combined output voltage VO on an output node that connected to a single load. Pins SET1~SET4 are configured to share a phase control signal in the daisy chain, PASS1~PASS3 pins are respectively connected to TAKE2~TAKE4 pins, PASS4 pin is connected to TAKE1, to follow the TAKE/PASS loop in the daisy chain. CTRL1~CTRL4 pins are tied together and are connected to the input judging circuit 31, to receive an enable control signal.

In the example of FIG. 3, the input judging circuit 31 can enable or disable the monolithic IC 301 by sending the enable control signal to the tied CTRL pins of the monolithic IC 301. In one embodiment, the monolithic IC 301 is enabled, i.e., operable to provide power from the multiple input sources to the single load, when the enable control signal is asserted on the tied CTRL pins. The monolithic IC 301 is disabled, i.e., stop providing power to the load, when the enable control signal is not asserted.

In one embodiment, when all the voltages of input sources are normal, the input judging circuit 31 generates the enable control signal with high level, the enable control signal is asserted. When the voltage of any one of the input sources is not ready, the input judging circuit 31 generates the enable control signal with low level, the enable control signal is not asserted.

In the example of FIG. 3, the power system 300 is a dual-input single output power system for illustration purposes. As can be appreciated, the power system 300 can also be any multi-input (e.g., INPUT 1~INPUT N) single output power system in which at least one input source (INPUT 1) is always plug-in or available, and one or more input sources (e.g., INPUT 2 to INPUT N) can be flexibly and selectively plug-in or un-plugged.

Figure 4:
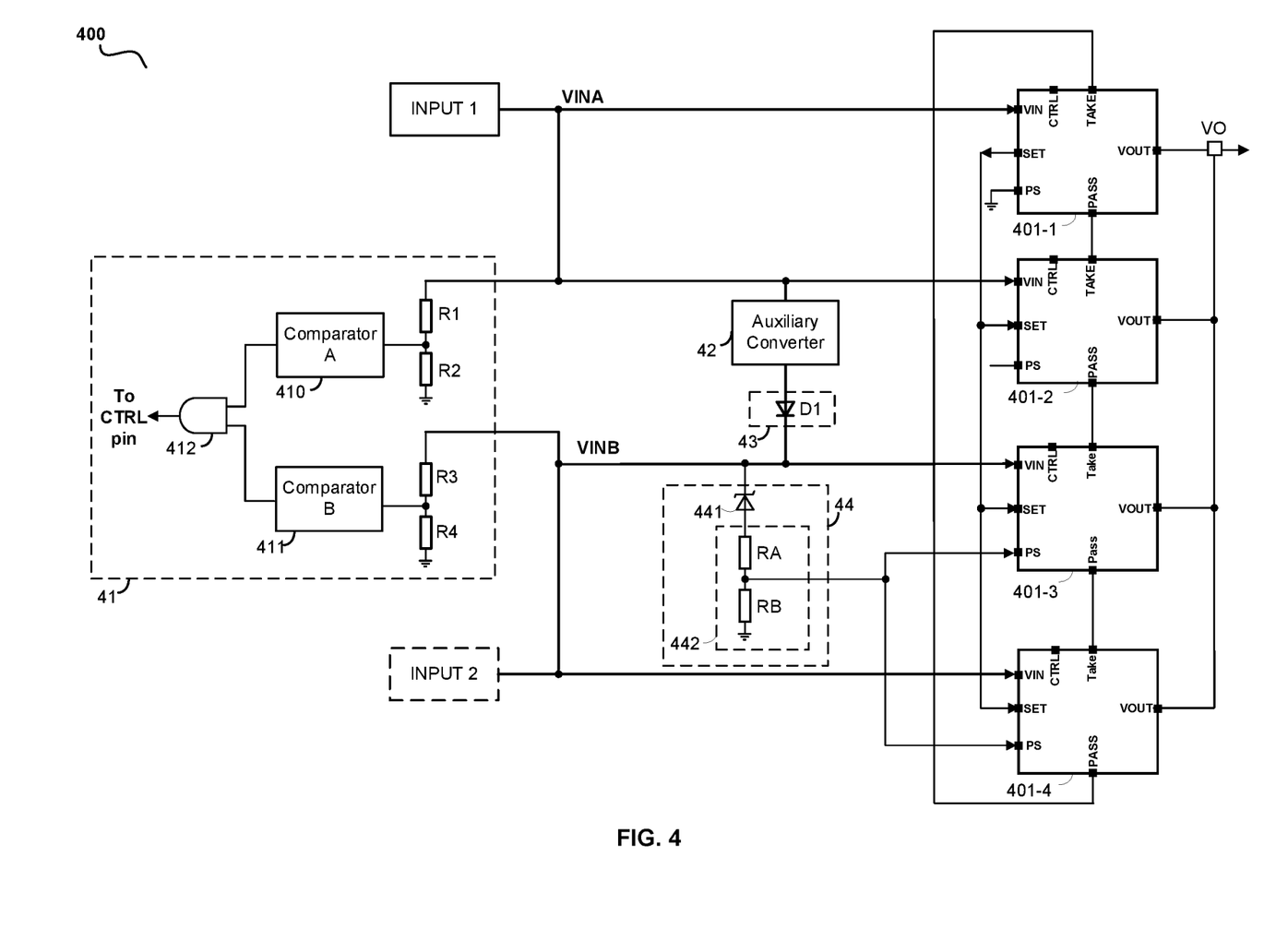
FIG. 4 shows a schematic diagram of a multi-input single output power system 400 in a lower power state in accordance with an embodiment of the present invention.

Under some conditions when at least one input source is un-plugged, the load of the power system operates in a lower power state. FIG. 4 shows a schematic diagram of a multi-input single output power system 400 in a lower power state in accordance with an embodiment of the present invention, wherein the circuit configuration is similar to that shown in FIG. 2. The difference is that, the first input source INPUT 1 is always plug-in, the second input source INPUT 2 is un-plugged, and the load of the power system 400 operates in a mode in which its power consumption is reduced. For this reason, the second input source INPUT 2 is depicted with a dashed line border.

In one embodiment, power consumption is reduced by disabling the switching of the power switch in the plurality of converter devices that are connected to the un-plugged input source (INPUT 2). Meanwhile, the logic circuit of the disabled converter devices is active to maintain control functions and the TAKE/PASS loop in the daisy chain. The converter devices that are connected to the plugged input source (INPUT 1) remain in a powered state and is configured to convert the first input voltage VINA into the output voltage VO at the output node.

Keep multi-input single output the power system 400 in operating when one or more input sources other than the first input source INPUT 1 is un-plugged from the power system 400. The term "Operating", as used herein, is defined as a condition in which the output voltage VO is regulated and current is delivered from the input source to the load in a controlled manner.

In the example of FIG. 4, the multi-input single output power system 400 comprises a plurality of converter devices 401 coupled in parallel and configured in the daisy chain, an input judging circuit 41, an auxiliary DC/DC converter 42, a polarity protection element 43 and a phase shedding controller 44.

In one embodiment, the input judging circuit 41 is configured to provide an enable control signal to the tied CTRL pins based on the conditions of the multiple input sources. In the example of FIG. 4, the input judging circuit 41 is configured to judge if any of input supply voltages VINA and VINB are not less than an enable threshold, and provides an enable control signal to the CTRL pins.

In the example of FIG. 4, the input judging circuit 41 comprises a first voltage divider consisted of resistors R1 and R2, a first comparator 410, a second voltage divider consisted of resistors R3 and R4, a second comparator 411 and an AND circuit 412. The first voltage divider is coupled to the first input source INPUT 1 and provides a first sensing voltage representative of the first input voltage VINA. The first comparator 410 is configured to compare the first sensing voltage with a first enable threshold. The second voltage divider is coupled to the second input source INPUT 2 and provides a second sensing voltage representative of the second input voltage VINB. The second comparator 411 is configured to compare the second sensing voltage with a second enable threshold. In one embodiment, the first and second enable thresholds are equal. Only when the outputs of the first comparator 410 and the second comparator 411 are both high, the AND circuit 412 generated the enable control signal with high level, and the enable control signal is asserted. Otherwise, the enable control signal is not asserted.

In one embodiment, the enable control signal is asserted when the enable signal voltage on the CTRL pin is higher than 1.4V, and the enable control signal is not asserted when the enable signal voltage on the CTRL pin is lower than 1.2V.

In the example of FIG. 4, two converter devices (401-1, 401-2) are coupled in parallel to form a first group, the VIN pins of the converter devices (401-1, 401-2) are tied together and connected to a first input source INPUT 1, to receive a first input voltage VINA. Another two converter devices (401-3, 401-4) are coupled in parallel to form a second group, the VIN pins of the converter devices (401-3, 401-4) are tied together, and coupled to an output terminal of the auxiliary DCDC converter 42 through the polarity protection element 43. A second input source INPUT 2 is un-plugged and is not connected to the VIN pins of the second group converter devices (401-3, 401-4). In the example of FIG. 4, the auxiliary DCDC converter 42 is configured to provide a low DC standby voltage directly available to the VIN pins of the second group converter devices (401-3, 401-4). As an example, the auxiliary DCDC converter 42 is a buck converter. The buck converter is a class of switched-mode power supply that typically includes transistors configured to step down an input voltage to provide a corresponding output voltage to one or more storage elements, such as including a capacitor and/or an inductor.

The VOUT pins of the converter devices (401-1, 401-2, 401-3, 401-4) are tied together, provide a combined output voltage VO at the tied VOUT pins. In one embodiment, the second group converter devices (401-3,401-4) that are disconnected from the unplugged input sources keep active in a phase shedding mode (not providing output voltage), where the second input source INPUT 2 is un-plugged and the outputs of the converter devices (i.e., 401-3, 401-4) that are disconnected from the second input source INPUT 2 are turned OFF. The power system 400 is configured to convert the first input supply voltage VINA into the output voltage VO on the output node that is connected to the load.

In one embodiment, the first input voltage VINA from the first input source is 12V. The auxiliary DC/DC converter 42 is coupled between the tied VIN pins of the first group converter devices (401-1, 401-2) and the tied VIN pins of the second group converter devices (401-3, 401-4), and is configured to convert the first input voltage VINA into the DC standby voltage(e.g., 5V). The 5V standby voltage is a very low current output that used by the power system 400 only supply the control circuits of the second group converter devices (401-3, 401-4) that are disconnected from the un-plugged second input source INPUT 2.

It is noted that the single output of the multi-input single output power system 400 refers to the output voltage VO ultimately to provide a total operational power to the single load. The 5V standby voltage provided by the auxiliary DCDC converter 42 is not considered as an "output" of the multi-input single output power system 400.

In one embodiment, the auxiliary DC/DC converter 42 can be configured to switch seamlessly to supply the second group converter devices (401-3, 401-4) through the polarity protection circuit 43. The polarity protection circuit 43 may be electrically coupled between the output terminal of the auxiliary DCDC converter 42 and the VIN pins of the second group converter devices (401-3,401-4). In one embodiment, the polarity protection circuit 43 comprises a diode D1. If the second input source INPUT 2 is normal, i.e., the second input voltage VINB on the VIN pins of the second group converter devices (401-3,401-4) is higher than the DC standby voltage provided by the auxiliary DC/DC converter 42, there is no current is flowing through the polarity protection circuit 43. And If the second input source INPUT 2 is un-plugged, i.e., the second input voltage VINB on the VIN pins of the converter devices (401-3,401-4) is less than the DC standby voltage provided by the auxiliary DC/DC converter 42, the diode D1 conducts and the current path back is blocked.

In the example of FIG. 4, each one of the plurality of converter device 401 has a plurality of pins that comprises a phase shedding (PS) pin. In one embodiment, among the plurality of converter devices 401 configured as a multiphase switching converter, the converter device 401-1 is configured as a master-phase switching converter, all the other converter devices (401-2~401-4) are respectively configured as a slave-phase switching converter.

In some embodiments, to ensure safe operation of the multiphase switching converter 401, the phase shedding mode of the master phase is blocked. That is, the master phase will not enter the phase shedding mode in any case. In the example of FIG. 4, the PS pin of the master-phase converter device 401-1 is connected to ground. The converter device 401-2 is working as a slave phase and has a PS pin that is float.

In one embodiment, each one of the converter devices (401-3, 401-4) has a PS pin and a phase shedding control signal VPS on the PS pin. The phase shedding control signal is configured to decide whether to perform phase shedding function, this is, to determine whether to stop the corresponding converter device from providing power to the load, in order to reduce power consumption and improve system efficiency. In one embodiment, the slave phases can be enabled or disabled through PS pins. In some embodiments, the slave phases are enabled when PS pin is pulled high and the slave phases are disabled when PS pin is pulled low.

In the example of FIG. 4, the power system 400 includes the phase shedding controller 44 that may be operative to detect a power reduction trigger. In one embodiment, the phase shedding controller 44 may comprise information and/or signals indicating the existence of circumstances under which a reduction in power consumption is desirable. In one embodiment, the power reduction trigger indicates that a connection to an external input source has been removed.

In the example of FIG. 4, the phase shedding controller 44 is configured to detect if one or more input sources other than the first input source INPUT 1, for example the second input source INPUT 2, is un-plugged.

In the example of FIG. 4, the phase shedding controller 44 comprises a zener diode 441 with a clamp voltage VZ and a third voltage divider 442 consisted of resistors RA and RB. The zener diode 441 has an anode connected to the third voltage divider 442 and a cathode connected to the VIN pins of the second group converter devices (401-3, 401-4). When the second input voltage VINB (e.g., 12V) at the VIN pins of the converter devices (401-3, 401-4) is higher than the clamp voltage VZ (e.g., 8V), the zener diode 441 will conduct, and the third voltage divider 442 can be configured to generate a phase shedding control signal on the PS pin with high level at its output terminal. When the second input voltage VINB at the VIN pins of the second group converter devices (401-3, 401-4) is less than the clamp voltage VZ, the zener diode 441 will be blocked. The phase shedding control signal will be pulled low.

In the example of FIG. 4, when the phase shedding control signal on the pins PS of the second group converter devices (401-3, 401-4) is high, the power of the second group converter devices (401-3,401-4) connected to the unplugged input source will be removed.

Figure 5:
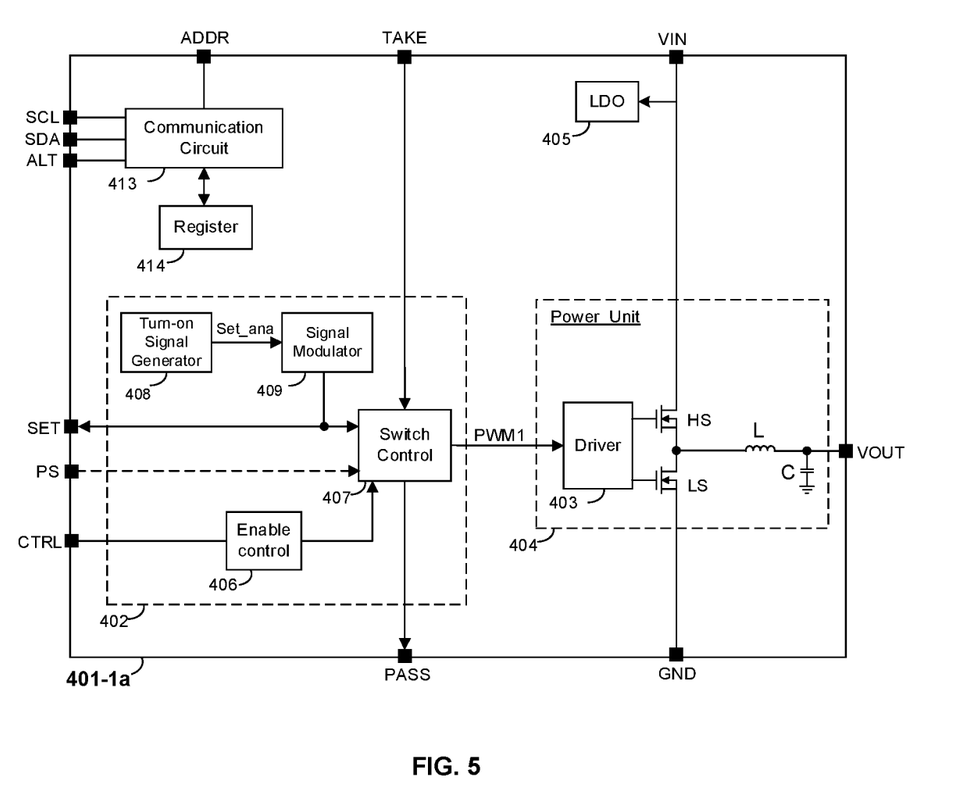
FIG. 5 shows details of a master-phase converter device 401-1a used in a multiphase switching converter in accordance with an embodiment of the present invention.

FIG. 5 shows details of a master-phase converter device 401-1*a* used in a multiphase switching converter in accordance with an embodiment of the present invention.

In the example of FIG. 5, the converter device 401-1*a* is configured as a master phase of the multiphase switching converter 401 shown in FIG. 4 and is a single-die chip that comprises a control circuit 402, a power unit 404 and a plurality of pins. Pin VIN is configured to receive an input voltage, pin GND is couple to a power ground, and pin VOUT is coupled to a load for outputting an output voltage, Pin SET is configured to share a phase control signal, pin TAKE is configured to receive a phase input signal, pin PASS is configured to provide a phase output signal, pin CTRL for receiving an enable control signal based on the conditions of all the input sources, and pin PS is blocked.

In the example of FIG. 5, a low dropout regulator (LDO) 405 is included in the converter device 401-1*a* and receives the input voltage VINA at the VIN pin and generates a supply voltage (e.g., 3.3V).

In the example of FIG. 5, the control circuit 402 is configured to provide a switch control signal PWM1 to the power unit 404. It comprises a turn-on signal generator 408, a signal modulator 409, an enable control circuit 406 and a switch control circuit 407. The turn-on signal generator 408 generates a turn-on control signal Set_ana. The signal modulator 409 is coupled to the turn-on signal generator 408 to receive the turn-on control signal Set_ana, and is configured to generate the phase control signal based thereupon. In one embodiment, the turn-on control signal Set_ana can be generated through comparing the output voltage Vout of the multiphase switching converter with a reference signal. It could also be a periodical clock signal produced by an oscillator.

The switch control circuit 407 is coupled to the signal modulator 409, and the enable control circuit 406, and is configured to generate the switch control signal PWM1 for the power unit 404 and the phase output signal based on the phase control signal and the phase input signal.

In one embodiment, the enable control signal from the input judging circuit 41 shown in FIG. 4 can be received on the CTRL pin of the converter device 401-1*a* by an enable control circuit 406. In one embodiment, the enable control circuit 406 (see FIG. 5) has a fixed blanking time after the LDO 405 output supply voltage and the input supply voltage VIN becomes higher than an under voltage lockout (UVLO) threshold or after the enable control signal becomes HIGH, whichever occurs last. The HIGH level enable control signal at the CTRL pin during the blanking time will not turn ON a power switch of the power unit 404. At the end of the blanking time, the CTRL pin allows to turn ON the power switch of the power unit 404 if no fault is detected. Once the CTRL pin is pulled to a level higher than 1.4V and the blanking time ends, the driver circuit 403 drives the gate of the power switch (i.e., HS), then the output voltage VO at the pin VOUT rises.

In some embodiments, the converter device 401-1*a* further includes a communication circuit 413 and a register circuit 414, respectively used for information exchange and data storage.

Figure 6:
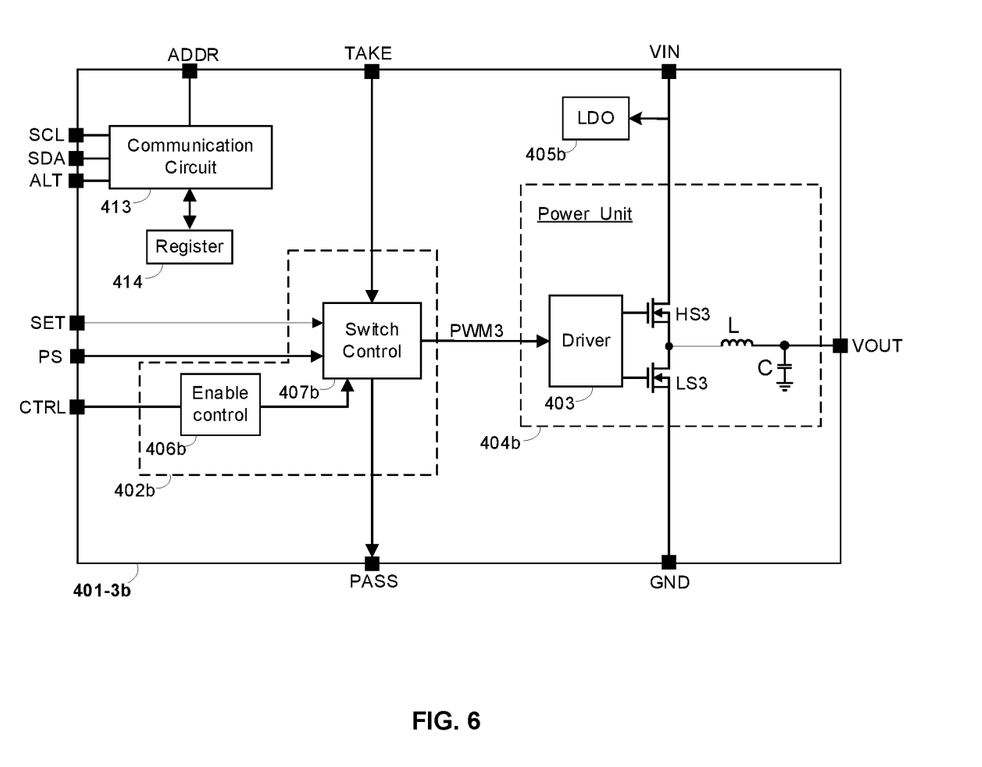
FIG. 6 shows details of a slave-phase converter device 401-3b used in a multiphase switching converter in accordance with an embodiment of the present invention.

FIG. 6 shows details of a slave-phase converter device 401-3*b* used in a multiphase switching converter in accordance with an embodiment of the present invention. In the example of FIG. 6, the converter device 401-3*b* is configured as a slave phase of the multiphase switching converter and is a single-die chip that comprises a control circuit 402*b*, a power unit 404*b*, a LDO circuit 405*b*, a communication circuit 413, a register circuit 414 and a plurality of pins. Pin SET is configured to share a phase control signal, pin TAKE is configured to receive a phase input signal, pin PASS is configured to provide a phase output signal, pin VIN is configured to receive an input voltage, pin GND is couple to a power ground, and pin VOUT is coupled to a load for outputting an output voltage, pin CTRL is configured to enable/disable the converter device 401-3*b*, and pin PS is configured for phase shedding function based on an external phase shedding control signal.

In the example of FIG. 6, a low dropout regulator (LDO) 405*b* is included in the converter device 401-3*b* and receives the second input supply voltage VINB at the VIN pin and generates a supply voltage.

In the example of FIG. 6, the control circuit 402*b* comprises an enable control circuit 406*b* and a switch control circuit 407*b*. The enable control circuit 406*b* shown in FIG. 6 operates generally similarly as enable control circuit 406 shown in FIG. 5. As a result, operation of enable control circuit 406*b* in FIG. 4 is omitted for clarity.

In the example of FIG. 6, the switch control circuit 407*b* is coupled to the enable control circuit 406*b*, and is configured to generate the switch control signal PWM3 and the phase output signal based on the phase control signal, the phase input signal and the external phase shedding control signal on the pin PS.

If an un-plugged input source is detected, the phase shedding control signal on the pin PS is pulled low to make the converter device 401-3*b* enter phase shedding mode.

In the phase shedding mode, the switch control signal PWM3 provided by the control circuit 402*b* maintains a high impedance state or a low level to disable the power unit 404*b*. The transistors HS and LS are both turned OFF to stop providing power to the load. People of ordinary skills can recognize that, however, other suitable ways could also be used to disable the power unit 404*b*. Furthermore, when the power units 404*b* gets disabled, the power switches in the power unit 404*b* do not have to be turned OFF simultaneously. For a synchronous BUCK, the high side switch HS3 can be turned OFF first, and the low side switch LS3 can be turned OFF later, when a zero cross of inductor current is detected. Meanwhile, the phase output signal is set to be equal to the phase input signal.

In one embodiment, the control circuit 402*b* is coupled to a communication bus, and are able to communicate with an external host controller through the communication bus. Based on the communicated data, the host controller decides whether to conduct phase shedding and generates a phase shedding command. The control circuit 402*b* receives the phase shedding command from the host controller through the communicate bus, and determines whether to enter into a phase shedding mode based on the content of the phase shedding command (e.g. the expected lower power state). If the phase shedding command determines to enter the phase shedding mode, the corresponding power unit will be disabled and stop providing power to the load.

The communication bus mentioned above could be I2C, SPI, SCI, UART, and other commonly used buses. PMBUS or SMBUS protocol can be adopted when I2C bus is used. Of course, in some applications, the phase shedding command can be directly generated by the control circuit of master phase without the help of a host controller.

In one embodiment, the phase shedding is controlled through the PMBUS. The REG_PS is a register in the register circuit 414, to write data into REG_PS through the communicate bus to realize phase shedding control.

Figure 7:
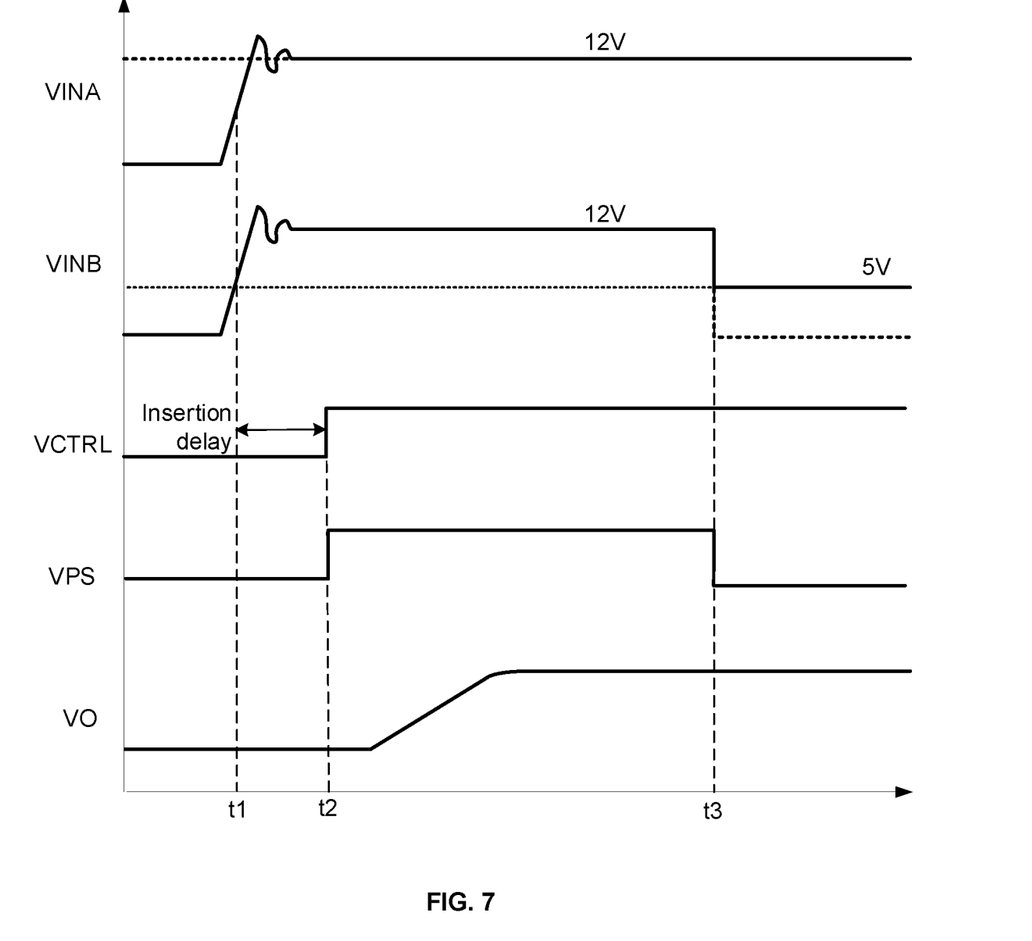
FIG. 7 shows waveforms illustrating startup sequences of the power system 400 shown in FIG. 4 in accordance with an embodiment of the present invention.

FIG. 7 shows waveforms illustrating startup sequences of the power system 400 shown in FIG. 4 in accordance with an embodiment of the present invention. For a hot-pluggable application, the VIN pins of the converter device 401 can experience a voltage spike or transient during a hot-plug procedure. The voltage spike or transient is typically caused by parasitic inductance of an input trace and an input capacitor on the VIN pin. When the plurality of converter devices 401 is configured to work with the input judging circuit 41, the CTRL pin may be pulled LOW by the enable control circuit 406 to turn OFF the power switch for an insertion delay time to stabilize the input voltage VINA and VINB. The CTRL pin may be driven HIGH by the enable control circuit 406 to enable the power switch of the power unit to turn ON after expiration of the insertion delay time.

As shown in FIG. 7, the input voltage VINA and VINB increase at a relatively fast rate. Accordingly, a power switch of the power unit is kept OFF by the control circuit during plug-in of the input sources. The power switch of the converter device is turned OFF until the output of the enable control circuit 406/406b is pulled to HIGH. The enable control circuit 406 (see FIG. 5) has an insertion delay time after the LDO output voltage and the input power supply voltage VIN becomes higher than the UVLO threshold (at time t1), the output of the enable control circuit 406/406b becomes HIGH(at time t2). Then the driver circuit 403 drives the power switch to turn ON, then the output voltage VO rises.

At time t3, the second input source INPUT 2 is unplugged, the second input voltage VINB at the VIN pins of the converter devices (401-3, 401-4) is switched seamlessly from 12V to 5V. All the plurality of converter devices still can be enabled by the CTRL pin due to the voltage VCTRL is still higher than 1.4V. The phase shedding function can be enabled by the phase shedding control signal (VPS) which becomes low level from high level. So the switching of the power switches in the second group converter devices (401-3, 401-4) are disabled. Meanwhile, the logic control circuit of the disabled converter devices is active to maintain control functions and the TAKE/PASS loop, the multi-input single output power system 400 works in a low power state and can still output the output voltage VO to the load.

Figure 8:
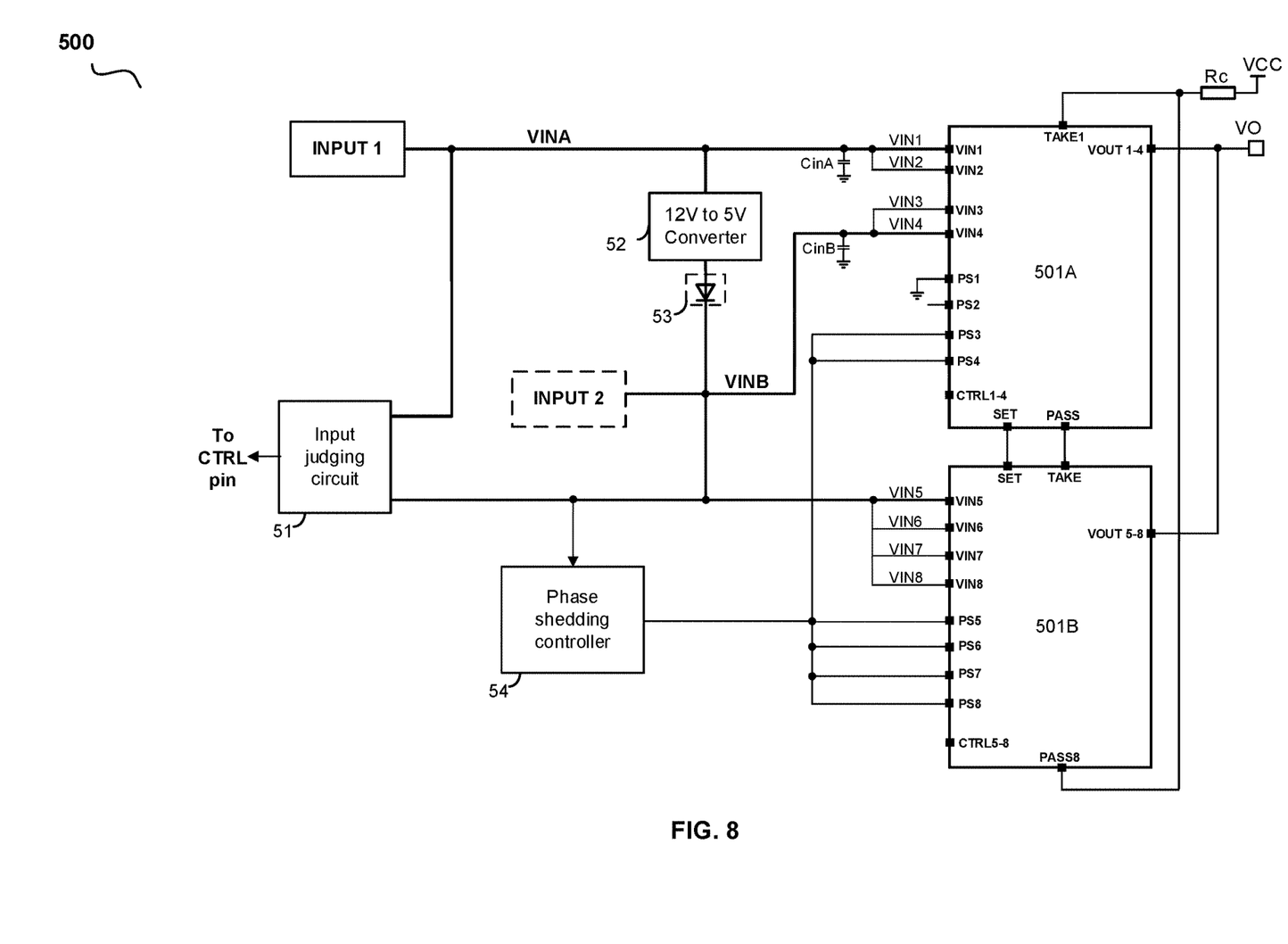
FIG. 8 shows a schematic diagram of a multi-input single output power system 500 in accordance with yet another embodiment of the present invention.

FIG. 8 shows a schematic diagram of a multi-input single output power system 500 in accordance with yet another embodiment of the present invention.

In the example of FIG. 8, the power system 500 comprises a multi-phase switching converter 501 consisted of two monolithic power module devices 501A and 501B, an input judging circuit 51, an auxiliary DC/DC converter 52(e.g., a 12V~5V converter), a polarity protection circuit 53 and a phase shedding controller 54.

In the example of FIG. 8, a first power module device 501A includes four-phase converter devices and a second power module device 501B includes four-phase converter devices. As shown in FIG. 8, a first phase of the first power module device 501A can be configured as a master phase by connecting the pin TAKE1 to a power supply voltage VCC through an external pull-up resistor Rc.

Alternatively, without such an external pull-up resistor Rc connected to pin TAKE, each one of the other phases of the first power module device 501A is configured as a slave phase, each phase of the second power module device 501B is also configured as a slave phase.

Figure 9:
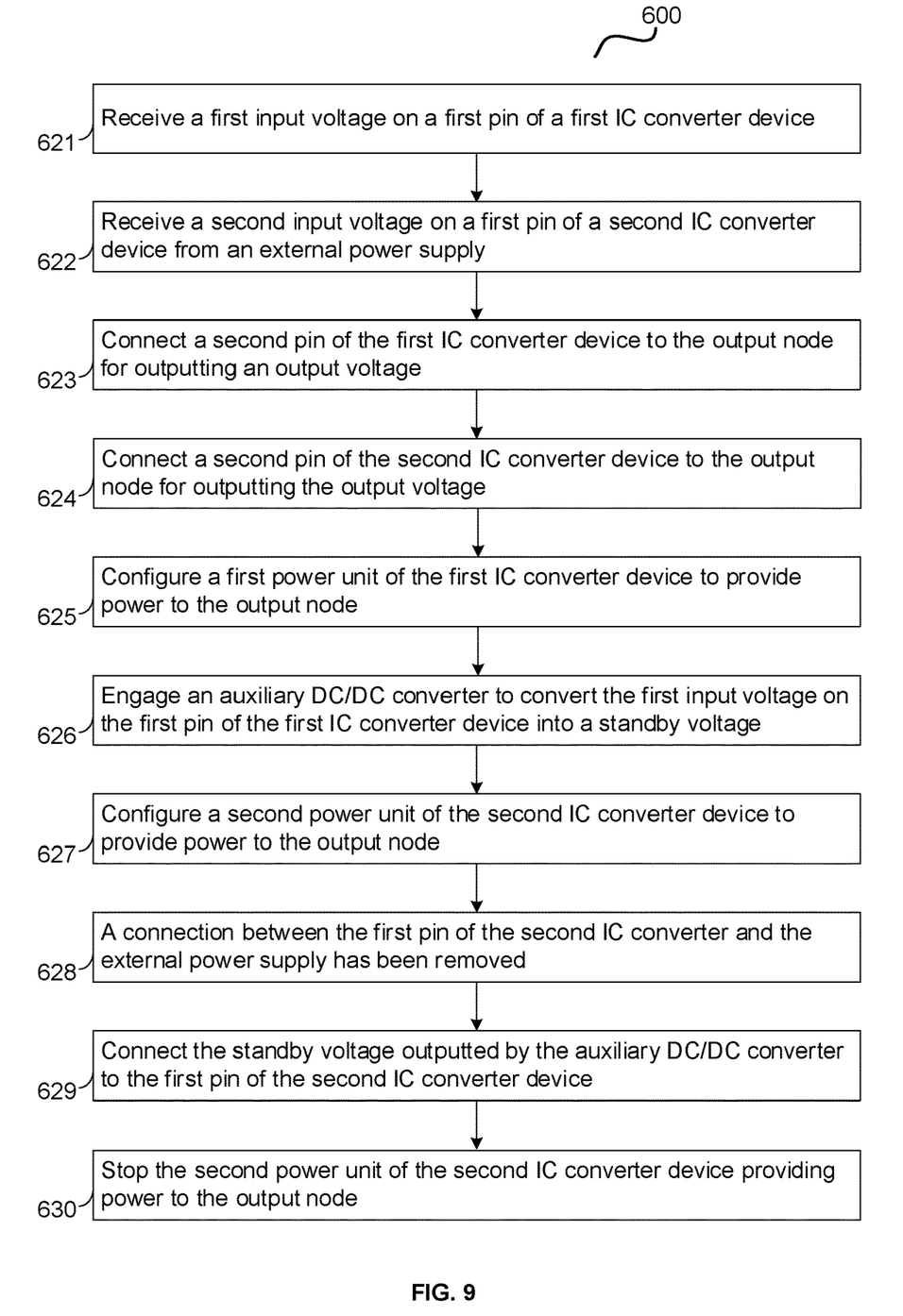
FIG. 9 shows a flow diagram of a method of operating a multi-input single output power system in accordance with an embodiment of the present invention.

FIG. 9 shows a flow diagram of a method of operating a multi-input single output power system in accordance with an embodiment of the present invention.

The method of FIG. 9 may be performed by using a plurality of converter devices connected in parallel and configured in a daisy chain. As can be appreciated, other converter devices may also be employed without detracting from the merits of the present invention.

In the example of FIG. 9, the power system at least comprises a first IC converter device and a second IC converter device. The method comprises steps 621~631. The first IC converter device receives a first input voltage on the first pin (step 621), connects a second pin to an output node for outputting an output voltage (step 623), and configures the first power unit to provide power to the output node (step 625). The second IC converter device receives a second input voltage on the first pin (step 622) from an external power supply, connects a second pin to the output node for outputting the output voltage (step 624), and configures a second power unit to provide power to the output node (step 627).

In the example of FIG. 9, an auxiliary DC/DC is engaged to convert the first input voltage on the first pin of the first IC converter device into a standby voltage (step 626).

Once a connection between the first pin of the second IC converter device and the external power supply has been removed (step 628). The standby voltage provided by the auxiliary DC/DC converter is connected to the first pin of the second IC converter device (step 629), that is the standby voltage is used as the second input voltage of the first pin of the second IC converter device. The second power unit of the second IC converter device is disabled to stop providing power to the output node.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The operation steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A multi-input single output power system having an output node for outputting an output voltage, the power system comprising:
a first integrated circuit (IC) converter device comprising a first pin that is configured to receive a first input voltage, a second pin that is configured to output the output voltage, and a first power unit that is coupled between the first pin of the first IC converter device and the second pin of the first IC converter device, wherein the first power unit is configured to provide power to the output node;
a second IC converter device comprising a first pin that is configured to receive a second input voltage, a second pin that is configured to output the output voltage, a second power unit that is coupled between the first pin of the second IC converter device and the second pin of the second IC converter device, and a third pin that is configured to receive a phase shedding control signal to determine whether to stop the second power unit from providing power to the output node; and
wherein the first IC converter device has a first control circuit that is configured to drive a first power switch of the first power unit of the first IC converter device, the second IC converter device has a second control circuit that is configured to drive a second power switch of the second power unit of the second IC converter device, wherein the first control circuit of the first IC converter device and the second control circuit of the second IC converter device are configured in a daisy chain.

2. The power system of claim 1, further comprises a phase shedding controller that is configured to provide the phase shedding control signal to the third pin of the second IC converter device based on the condition of the second input voltage on the first pin of the second IC converter device.

3. The power system of claim 1, further comprises:
an auxiliary DC/DC converter having an input terminal configured to receive the first input voltage on the first pin of the first IC converter device and an output terminal, wherein the auxiliary DC/DC converter is configured to convert the first input voltage on the first pin of the first IC converter device into a standby voltage at the output terminal; and
a polarity protection circuit connected to the output terminal of the auxiliary DC/DC converter to the first pin of the second IC converter device to connect the standby voltage to the first pin of the second IC converter device through the polarity protection circuit.

4. The power system of claim 1, further comprises a third IC converter device comprising a first pin that is configured to receive the second input voltage on the first pin of the second IC converter device, a second pin that is configured to output the output voltage, a third power unit that is coupled between the first pin of the third IC converter device and the second pin of the third IC converter device, a third control circuit that is configured to drive a third power switch of the third power unit of the third IC converter device, and a third pin that is configured to receive the phase shedding control signal to determine whether to stop the third power unit from providing power to the output node, wherein the first control circuit of the first IC converter, the second control circuit of the second IC converter device and the third control circuit of the third IC converter device are configured in the daisy chain.

5. The power system of claim 1, further comprises a fourth IC converter device comprising a first pin that is configured to receive the first input voltage on the first pin of the first IC converter device, a second pin that is configured to output the output voltage, a fourth power unit that is coupled between the first pin of the fourth IC converter device and the second pin of the fourth IC converter device, a fourth control circuit that is configured to drive a fourth power switch of the fourth power unit of the fourth IC converter device, wherein the first control circuit of the first IC converter, the second control circuit of the second IC converter device and the fourth control circuit of the fourth IC converter device are configured in the daisy chain.

6. The power system of claim 1, wherein the first IC converter device further comprises a fourth pin configured to receive an enable control signal to enable the first IC converter device, and the second IC converter device further comprises a fourth pin connected the fourth pin of the first IC converter device to enable the second IC converter device.

7. The power system of claim 6, wherein the power system further comprises an input judging circuit, the input judging circuit has a first input terminal configured to receive the first input voltage on the first pin of the first IC converter device and a second input terminal configured to receive the second input voltage on the first pin of the second IC converter device, wherein based on the conditions of the first input voltage on the first pin of the first IC converter device and the second input voltage on the first pin of the second IC converter device, the input judging circuit is configured to provide the enable control signal to the fourth pin of the first IC converter device and the fourth pin of the second IC converter device.

8. The power system of claim 1, wherein the second IC converter device is configured to communicate with a communication bus, and based on a phase shedding command from the communication bus, the second control circuit of the second IC converter device is configured to determine whether to stop the second power unit from providing power to the output node.

9. The power system of claim 1, wherein the first IC converter device and the second IC converter device are modularized in a single enclosure.

10. A multi-input single output power system having a plurality of IC converter devices that has a common output node for outputting an output voltage, wherein the plurality of the IC converter devices are configured as a multi-phase switching converter in a daisy chain, the power system comprising:
a first IC converter device of the plurality of IC converter devices comprising a first pin that is configured to receive a first input voltage, a second pin that is configured to output the output voltage, and a first power unit that is coupled between the first pin of the first IC converter device and the second pin of the first IC converter device, wherein the first power unit is configured to provide power to the output node;
a second IC converter device of the plurality of IC converter devices comprising a first pin that is configured to receive a second input voltage from an external power supply, a second pin that is configured to output the output voltage, a second power unit that is coupled between the first pin of the second IC converter device and the second pin of the second IC converter device, and a third pin that is configured to determine whether to stop the second power unit from providing power to the output node based on the condition of the second input voltage on the first pin of the second IC converter device; and an auxiliary DC/DC converter having an input terminal that is configured to receive the first input voltage on the first pin of the first IC converter device and an output terminal that is configured to provide the second input voltage on the first pin of the second IC converter device, when a connection of the first pin of the second IC converter device to the external power supply has been removed.

11. The power system of claim 10, further comprises an input judging circuit that is configured to provide an enable control signal at least based on the conditions of the first input voltage on the first pin of the first IC converter device and the second input voltage on the first pin of the second IC converter device.

12. The power system of claim 11, wherein the power system further comprises a polarity protection circuit that is connected between the output terminal of the auxiliary DC/DC converter and the first pin of the second IC converter device to connect the standby voltage to the first pin of the second IC converter device through the polarity protection circuit when the connection of the first pin of the second IC converter device to the external power supply has been removed.

13. The power system of claim 10, wherein each one of the plurality of IC converter devices further comprises a fourth pin configured to receive an enable control signal to enable the corresponding IC converter device.

14. The power system of claim 10, wherein the plurality of IC converter devices that are modularized in an enclosure.

15. A method of operating a multi-input single output power system having an output node for outputting an output voltage, the method comprising:

receiving a first input voltage on a first pin of a first IC converter device;

receiving a second input voltage on a first pin of a second IC converter device from an external power supply;

connecting a second pin of the first IC converter device to the output node;

connecting a second pin of the second IC converter device to the output node;

configuring a first power unit of the first IC converter device to provide power to the output node, wherein the first power unit is coupled between the first pin of the first IC converter device and the second pin of the first IC converter device;

engaging an auxiliary DC/DC converter to convert the first input voltage on the first pin of the first IC converter device into a standby voltage; and connecting the standby voltage outputted by the auxiliary DC/DC converter to the first pin of the second IC converter device when a connection between the first pin of the second IC converter and the external power supply has been removed.

16. The method of claim 15, wherein further comprises:

generating an enable control signal at least based on the conditions of the first input voltage on the first pin of the first IC converter device and the second input voltage on the first pin of the second IC converter device;

receiving the enable control signal on a third pin of the first IC converter device to enable the first IC converter device; and receiving the enable control signal on a third pin of the second IC converter device to enable the first IC converter device.

17. The method of claim 15, wherein further comprises:

generating a phase shedding control signal based on the condition of the second input voltage on the first pin of the second IC converter device; and receiving the phase shedding control signal on a fourth pin of the second IC converter device.

18. The method of claim 15, further comprises:

configuring a second power unit of the second IC converter device to provide power to the output node when the second input voltage on the first pin of the second IC converter device is not less than a first threshold, wherein the second power unit is coupled to the first and second pins of the second IC converter device; and stopping the second power unit of the second IC converter device providing power to the output node when the second input voltage on the first pin of the second IC converter device is less than the first threshold.

* * * * *